US012698764B2

(12) United States Patent
Kostov et al.

(10) Patent No.: US 12,698,764 B2
(45) Date of Patent: Aug. 4, 2026

(54) BISTABLE COMPRESSOR DRIVEN WITH SHAPE MEMORY ALLOYS FOR REFRIGERATOR

(71) Applicant: USONIA LABS LIMITED, London (GB)

(72) Inventors: Mihail Sinchets Kostov, London (GB); Todor Stoilov Todorov, London (GB)

(73) Assignee: USONIA LABS LIMITED, London (GB)

( * ) Notice: Subject to any disclaimer, the term of this patent is extended or adjusted under 35 U.S.C. 154(b) by 0 days.

(21) Appl. No.: 18/868,438

(22) PCT Filed: May 23, 2023

(86) PCT No.: PCT/EP2023/063842
§ 371 (c)(1),
(2) Date: Nov. 22, 2024

(87) PCT Pub. No.: WO2023/227629
PCT Pub. Date: Nov. 30, 2023

(65) Prior Publication Data
US 2025/0382950 A1      Dec. 18, 2025

(30) Foreign Application Priority Data
May 23, 2022    (GB) ..................................... 2207547

(51) Int. Cl.
*F03G 7/06* (2006.01)
*F04B 35/00* (2006.01)
(52) U.S. Cl.
CPC ....... *F03G 7/0646* (2021.08); *F03G 7/06143* (2021.08); *F04B 35/00* (2013.01)

(58) Field of Classification Search
CPC .. F03G 7/0646; F03G 7/06143; F03G 7/0614; F04B 35/00; F04B 35/04; F04B 9/00; F04B 17/00; F25B 1/02
(Continued)

(56) References Cited

U.S. PATENT DOCUMENTS

| | | | | | |
|---|---|---|---|---|---|
| 4,018,547 | A | * | 4/1977 | Rogen | E21B 43/128 417/545 |
| 4,945,727 | A | * | 8/1990 | Whitehead | F03G 7/06143 60/527 |

(Continued)

FOREIGN PATENT DOCUMENTS

| | | | |
|---|---|---|---|
| DE | 102007042791 A1 | 3/2009 | |
| EP | 0709573 A1 | 5/1996 | |

OTHER PUBLICATIONS

International Search Report and Written Opinion dated Jul. 7, 2023, for Application No. PCT/EP2023/063842.

*Primary Examiner* — Benjamin Doyle
(74) *Attorney, Agent, or Firm* — Conley Rose, P.C.

(57)                ABSTRACT
A device for actuating a compressor. The device includes a rocker movable between a first stable state and a second stable state, arranged such that on movement of the rocker a piston in a compressor chamber of variable volume is driven; one or more shape memory alloy (SMA) elements coupled to the rocker, actuatable to change between a first shape and a second shape; at least one temperature control region within which at least one of the shape memory alloy (SMA) elements is arranged, wherein the temperature within the temperature control region is controlled to vary the temperature of the SMA contained therein.

22 Claims, 11 Drawing Sheets

(58) Field of Classification Search
USPC ......................................................... 417/505
See application file for complete search history.

(56) References Cited

U.S. PATENT DOCUMENTS

| | | | | | |
|---|---|---|---|---|---|
| 5,079,920 | A | * | 1/1992 | Whitehead ............ | F03G 7/0612 |
| | | | | | 60/527 |
| 5,622,482 | A | * | 4/1997 | Lee ......................... | F04B 17/00 |
| | | | | | 417/415 |
| 7,922,458 | B2 | * | 4/2011 | Rush ....................... | F04B 35/00 |
| | | | | | 417/199.2 |
| 7,951,114 | B2 | * | 5/2011 | Rush ....................... | G01F 25/10 |
| | | | | | 604/151 |
| 2002/0131868 | A1 | * | 9/2002 | Joo ......................... | F04B 35/04 |
| | | | | | 417/417 |
| 2004/0115067 | A1 | * | 6/2004 | Rush .................... | F04B 49/065 |
| | | | | | 417/416 |

* cited by examiner

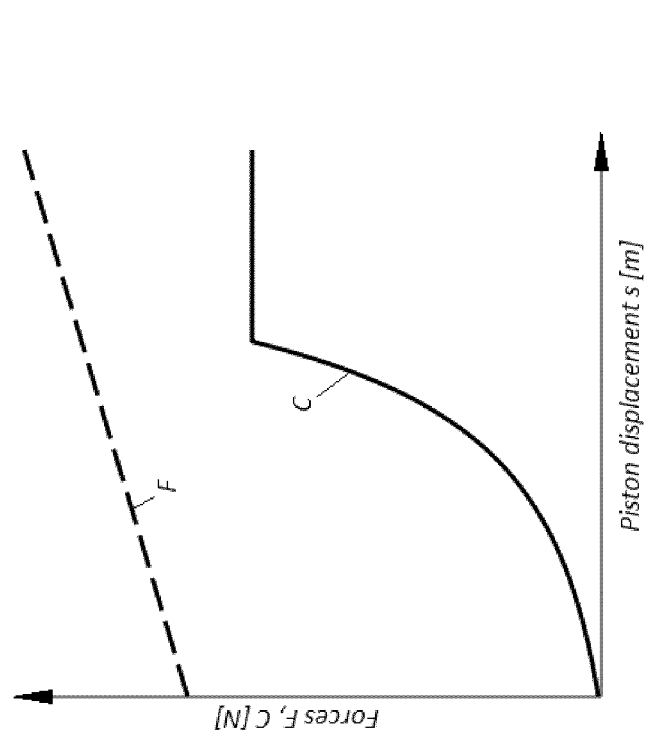
Fig. 6. A graph of the piston spring force *F*, and the force *C* of the piston gases during the compression-discharge period *vs* the displacement *s* of the piston.

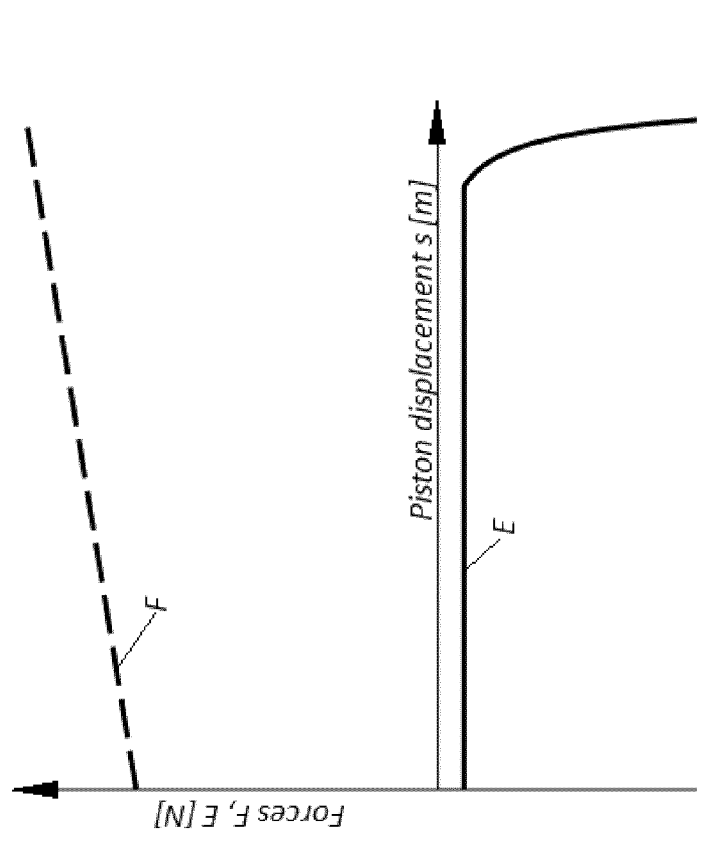
Fig. 7. A graph of the piston spring force F and the force E
of the piston gases during the expansion-suction period
with respect to the displacement s of the piston.

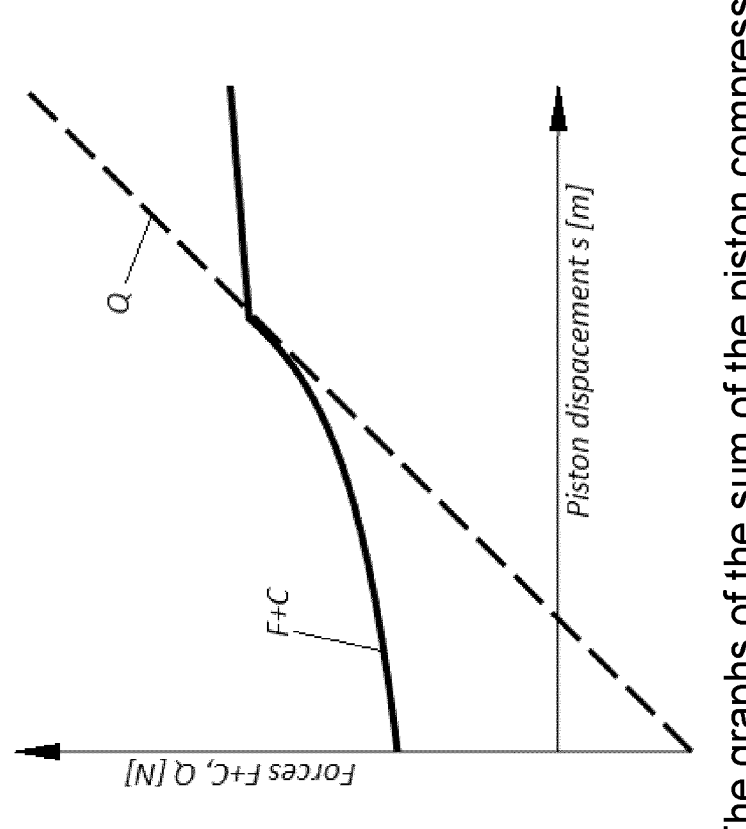
Fig. 8. The graphs of the sum of the piston compression gas force C plus piston spring force F and the recuperative force Q with respect to the piston displacement s.

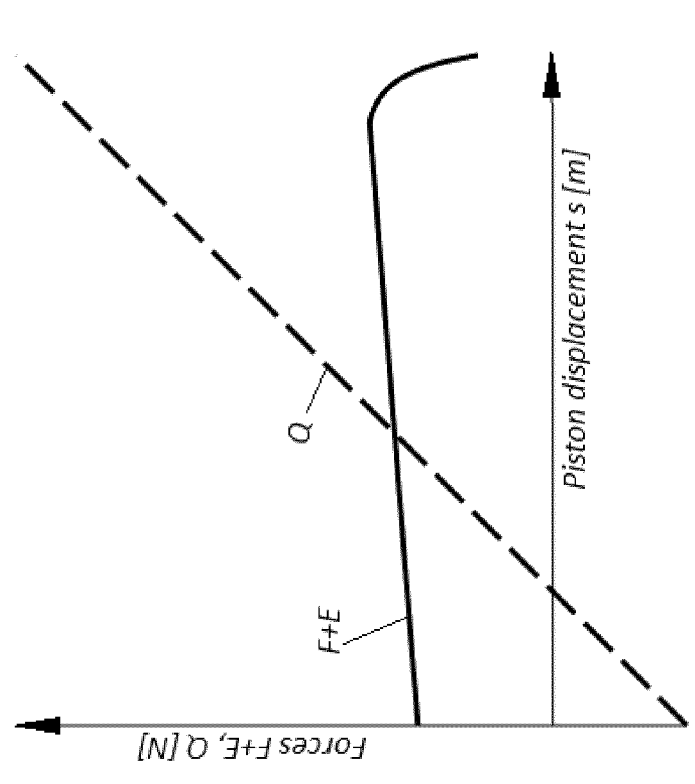
Fig. 9. The graphs of the sum of the piston suction gas force *E* plus piston spring force *F* and the recuperative force Q with respect to the piston displacement *s*.

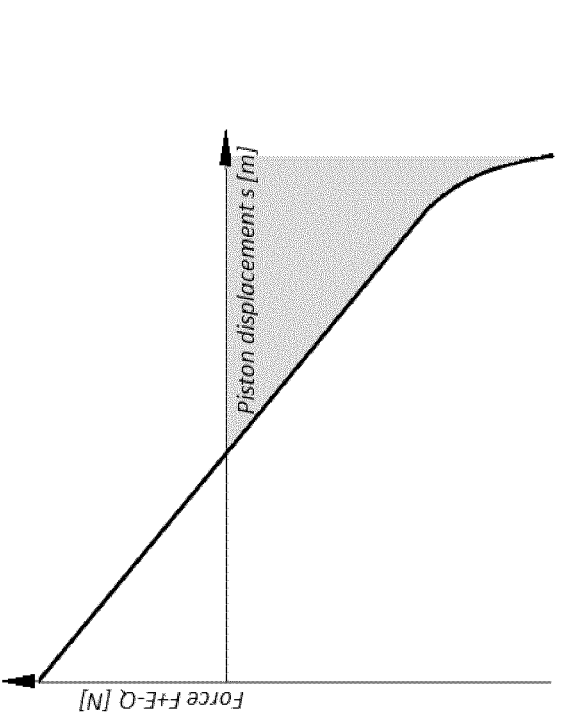
Fig. 11. The graph of the necessary shape memory alloy force during an expansion-suction period with respect to piston displacement s.
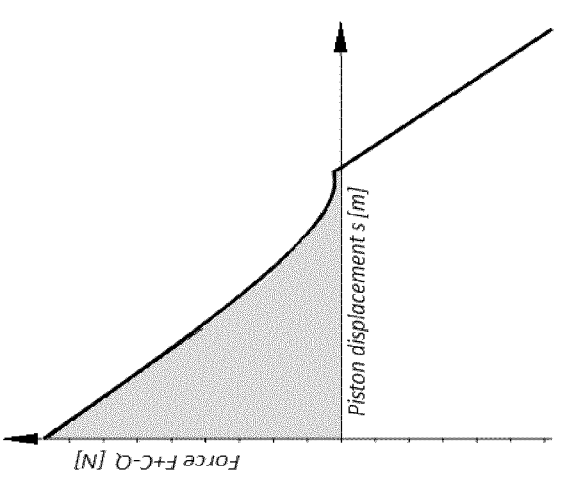
Fig. 10. The graph of the necessary shape memory alloy force during an compression-discharge period with respect to piston displacement s.

BISTABLE COMPRESSOR DRIVEN WITH SHAPE MEMORY ALLOYS FOR REFRIGERATOR

CROSS-REFERENCE TO RELATED APPLICATIONS

This is a U.S. National Stage of International Application No. PCT/CN2023/073171 filed on Jan. 21, 2023, which claims priority to Chinese Patent Application No. 202110566568.X, filed with the China National Intellectual Property Administration on May 24, 2021 and Chinese Patent Application No. 202110661936.9, filed with the China National Intellectual Property Administration on Jun. 15, 2021, all of which are incorporated herein by reference in their entireties.

FIELD OF THE DISCLOSURE

The present disclosure relates to a compressor for a refrigerator.

BACKGROUND

The present disclosure relates to a compressor for use on the suction or discharge side of a refrigeration system. The compressor can also be used in an air conditioner, an actuating jackhammer or for forcing air into inflatable objects.

In refrigeration systems, typically, a compressor is provided arranged to compress air or other gas. The air typically heats up in such a way that the heat can then be removed from the compressed gas. The compressed gas is then allowed to expand, cooling further thereby providing the desired refrigeration.

The most widely used compressors are based on reciprocating piston movement driven by an electric motor or a linear solenoid motor. Unfortunately, such drives have a large mass, heat up quickly, and work relatively noisily. Compressors working with shape memory alloys (SMAs) have small sizes, but they need a large amount of energy to overcome the gas forces and the force of a bias spring.

U.S. Pat. No. 5,622,482 discloses a pump utilizing SMA wire and a bias spring. The bias spring stretches an SMA wire and pushes the piston of the pump. Electric power heats up the SMA wire which pulls the piston and compresses the bias spring. Switching off the power supply leads to cooling of the SMA wire and a return of the piston to the initial position under the action of the bias spring. The pump has a simple structure which is light and easily repaired and maintained, but the SMA force has to overcome the forces of the spring and the gas pressure for the entire stroke of the piston, which leads to higher energy consumption.

U.S. Pat. No. 6,132,187 discloses a liquid/gas pump utilizing a stainless steel strip of uniform width that is encased within a flexible and liquid/gas impermeable plastic tube. Two elongated passageways are thus formed, above and below the metal strip. A linear series of bistable position and somewhat overlapping shallow domes are formed into the metal strip. The pump is actuated by a reciprocating motion. Although the liquid/gas is pumped without relative motion occurring between structural elements, the bistable behavior of the strips does not decrease the energy consumption due to the lack of recuperation.

GB 2558618 A (of the current inventors) discloses valve actuation of two SMA wires with opposite forces applied to a bistable mechanism with recuperating spring which interacts with a valve spring. The forces of the recuperating and valve springs are oppositely directed and have similar characteristics, which combined with the bistability, allows the application of small driving forces of SMA wires. In addition, these SMA forces drive the mechanism for only half of the valve closing and open strokes and the rest is driven by the springs. In this way energy consumption is reduced. The bistable actuator is small in size and works silently.

SUMMARY

It is desired to provide a compressor that is efficient and requires as little energy input as possible to produce the desired refrigeration.

According to a first aspect of the present disclosure, there is provided a compressor, comprising: a housing having a fluid inlet through which compressible fluid can be provided and a fluid outlet to enable passage of fluid from the housing; a compressor cylinder coupled to the housing and having a moveable member arranged to be driven in reciprocating movement during a compression cycle the cylinder being arranged to receive fluid from the housing; a rocker movable between a first stable state and a second stable state, arranged such that on movement of the rocker the moveable member is driven in the compressor cylinder; one or more shape memory alloy (SMA) elements coupled to the rocker, actuatable to change between a first shape and a second shape and thereby to drive the rocker In an embodiment, the housing defines a hermetically sealed space, such that the only passage of fluid into or out of the housing is via the fluid inlet and outlets A compressor is provided including a rocker driven in use by one or more SMA elements. A space is formed within the compressor housing for containing a fluid which enables temperature control of the SMA elements within the compressor. The housing, in embodiments, defines a hermetically sealed space such that fluid can only enter or leave via the fluid inlet or fluid outlet, i.e. apart from the fluid inlet and fluid outlet it is hermetically sealed.

In normal use the flow of fluid through the compressor (from the inlet to the outlet) will serve to provide temperature control of the space within the housing and thus control the temperature of the environment for the one or more SMA wires. The preferred hermetic sealing of the housing ensures that the temperature can be accurately controlled due to the absence of external fluid temperature interference e.g. the atmosphere.

Preferably the housing is formed of a temperature insulating material.

In an embodiment, the cylinder has valves timed to open and close such that upon movement of the piston in one direction, air is compressed and then driven out of the piston, and upon movement of the piston in the other direction, air is drawn into the piston.

In an embodiment, the housing includes a cap to define the hermetically sealed space.

In an embodiment, the rocker is a three part rocker arranged to pivot in reciprocating movement.

In an embodiment, the compressor further comprises a first spring connected to the rocker to provide a balancing force to the SMA elements.

In an embodiment, the compressor further comprises a second spring connected to the rocker to provide a balancing force to the SMA elements.

In an embodiment, the fluid inlet is arranged to receive cold gas into the hermetically sealed space.

In an embodiment, the fluid inlet is arranged to receive gas within a temperature range of –2.8 and 3.7 degrees C.

In an embodiment, the first spring is a compression spring arranged to be pivoted at a first end at a fixed position on the inside of the housing and at a second end to the rocker.

In an embodiment, the first spring is a piston spring arranged to bias the piston to a bottom dead center position and the second spring is a recuperative spring to provide recuperative force to the rocker during the compression cycle.

In an embodiment, the compressor comprises one or more adjustable holders for adjustably connecting the SMA elements to the housing.

There is also provided a refrigeration system, comprising a compressor according to the first aspect of the present disclosure, the refrigeration system further comprising a condenser to receive vapor from the compressor and an evaporator to receive liquid and provide cooled vapor as an input to the compressor for compression.

According to a third aspect of the present disclosure, there is provided a method of compressing a fluid, the method comprising: providing a housing, preferably defining a hermetically sealed space, and a compressor cylinder coupled to the housing and having a moveable member arranged to be driven in reciprocating movement during a compression cycle, a rocker movable between a first stable state and a second stable state, arranged such that on movement of the rocker the moveable member is driven in the compressor cylinder, one or more shape memory alloy (SMA) elements coupled to the rocker, actuatable to change between a first shape and a second shape and thereby to drive the rocker; providing a cooled fluid to the hermetically sealed space; providing fluid from the (preferably hermetically sealed) space into the cylinder for compression.

According to a further aspect of the present disclosure, there is provided a device for actuating a compressor, the device comprising: a rocker movable between a first stable state and a second stable state, arranged such that on movement of the rocker a piston in a compressor chamber of variable volume is driven; one or more shape memory alloy (SMA) elements coupled to the rocker, actuatable to change between a first shape and a second shape; at least one temperature control region within which at least one of the shape memory alloy (SMA) elements is arranged, wherein the temperature within the temperature control region is controlled to vary the temperature of the SMA contained therein.

In an embodiment, the device comprises at least two SMA elements, each arranged to in a temperature control region.

In an embodiment, the device comprises fluid flow conduits arranged, in use, to conduct the flow of fluid to and from a compressor to which the device may be connected.

In an embodiment, the device comprises at least one cold fluid flow conduit and at least one hot fluid flow conduit, wherein the or each temperature control region is a region thermally coupled to the or each cold fluid flow conduit and hot fluid flow conduit.

In an embodiment, the piston is arranged to move in a reciprocating manner in the cylinder coupled to a housing of the device.

In an embodiment, the cylinder has valves timed to open and close such that upon movement of the piston in one direction, air is compressed and then driven out of the piston, and upon movement of the piston in the other direction, air is drawn into the piston.

According to a further aspect of the present disclosure, there is provided a refrigeration system, comprising a device according to the first aspect of the present disclosure, the refrigeration system further comprising a condenser to receive vapor from the compressor in which and an evaporator to receive liquid and provide vapor as an input to the compressor for compression.

The actuator overcomes above mentioned problems of the pumps and compressors by using the principle of the SMA actuation through bistable linkage with recuperative spring which counteracts to a piston spring in order to decrease the total potential energy and to achieve minimal electric energy consumption. The bistable linkage remains stable in two positions corresponding to the bottom dead center (BDC) and top dead center (TDC) of the compressor piston. These two positions are switched over by SMA wires, which are electrically heated. SMA wires operate in cold gas generated by the compressor system. The operation of the wires in a cold environment reduces the cooling time of the wires from the SMA and this increases the operating frequency of the pump.

According to a further aspect of the present disclosure, there is provided a compressor, comprising: a housing having a fluid inlet through which compressible fluid can be provided and a fluid outlet to enable passage of fluid from the housing; a compressor chamber coupled to the housing and having a moveable member arranged to be driven in reciprocating movement during a compression cycle, the compressor chamber being arranged to receive fluid from the housing; a rocker movable between a first stable state and a second stable state, arranged such that on movement of the rocker the moveable member is driven in the compressor chamber; one or more shape memory alloy (SMA) elements coupled to the rocker, actuatable to change between a first shape and a second shape and thereby to drive the rocker.

Preferably, the chamber is a cylinder. Preferably it is a cylinder of circular cross-section. In an alternate example, the cross-section is elliptical.

BRIEF DESCRIPTION OF THE DRAWINGS

Embodiments of the present disclosure will now be described in detail with reference to the accompanying drawings, in which:

FIG. 6 shows a graph of the piston spring force F, and the force C of the piston gases during the compression-discharge period vs the displacement s of the piston;

FIG. 7 shows graph of the piston spring force F and the force E of the piston gases during the expansion-suction period with respect to the displacement s of the piston;

FIG. 8 shows the graphs of the sum of the piston compression gas force C plus piston spring force F and the recuperative force Q with respect to the piston displacement s;

FIG. 9 shows the graphs of the sum of the piston suction gas force E plus piston spring force F and the recuperative force Q with respect to the piston displacement s;

FIG. 10 shows the graph of the necessary shape memory alloy force during an compression-discharge period with respect to piston displacement s; and FIG. 11 shows the graph of the necessary shape memory alloy force during an expansion-suction period with respect to piston displacement s.

DETAILED DESCRIPTION

The system is further arranged such that the shape memory alloy wires operate in a cold chamber or region through which a cold gas of the compressor passes. The cold chamber or region accelerates cooling of the shape memory alloy wire, which thereby creates preconditions for increasing the switching frequency.

Figure 1:
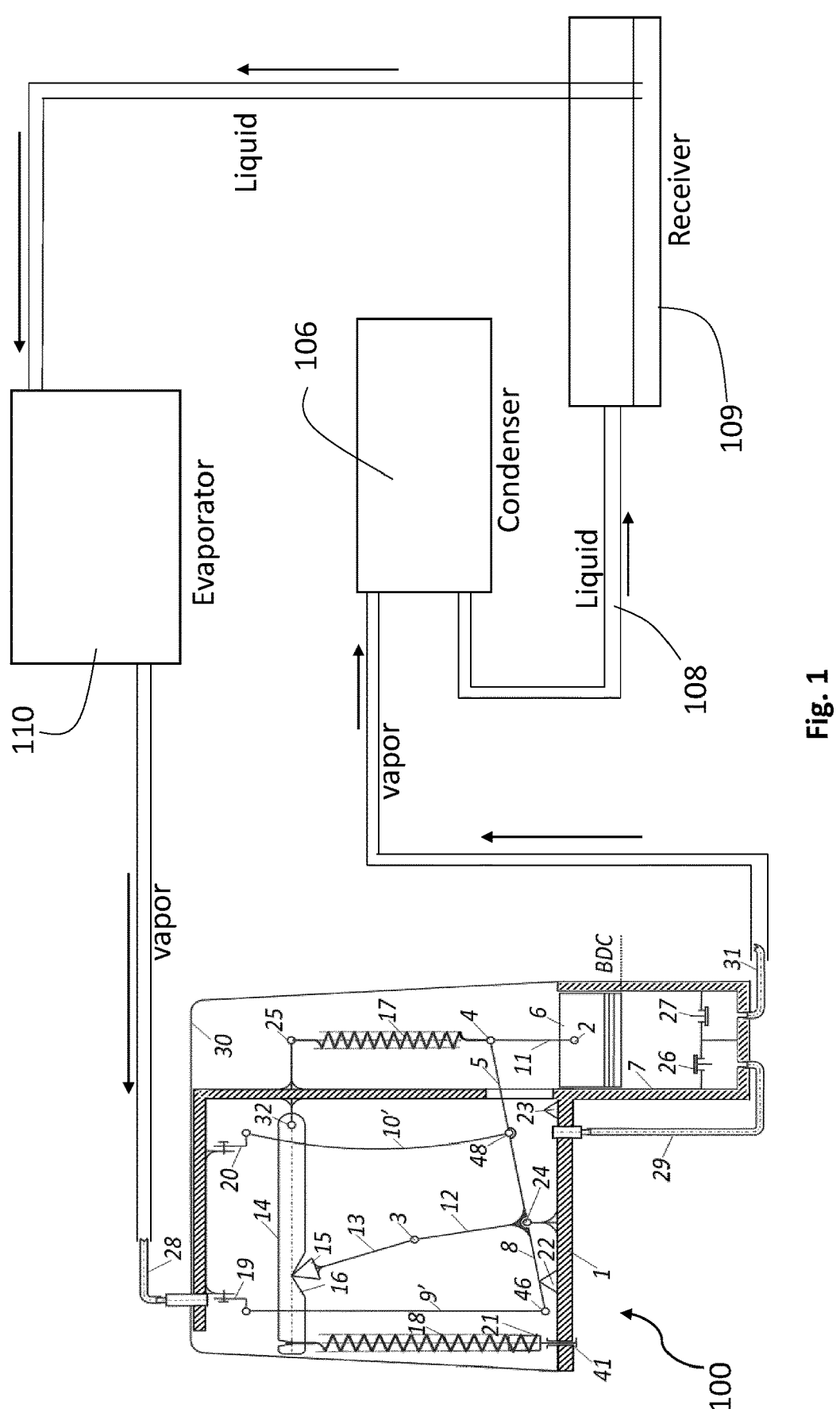
FIG. 1 is a schematic view of a refrigeration cycle.

Looking at FIG. 1, a schematic view of a well-known configuration for a refrigeration cycle is shown. The refrigeration cycle shown is a schematic view and, itself, is a well-known configuration. As will be explained below, the compressor provided within the refrigeration cycle is new and provides clear and distinct technical advantages.

Referring to the refrigeration system of FIG. 1, a compressor 100 is provided having an input 28 arranged to receive gas for compression. An output 31 is provided through which compressed gas is coupled to a condenser 106. Upon condensation, the cooled fluid is output via a conduit 108 as a liquid into receiver 109. The liquid is pumped from the receiver 109 into evaporator 110 in which the fluid is once more vaporized and provided in vapor form as an input at 28 to the compressor 100. The receiver 109 is shown including both liquid and vapor which would be provided to the evaporator for evaporation and provision as the input to the compressor 100.

Such a system is well known, but, as will be explained below, the present disclosure provides a modified version of a compressor 100 for use within a refrigeration system such as that of FIG. 1. It will be appreciated that the evaporator and condenser are shown schematically and would typically include serpentine or otherwise tortuous channels within them and other components to enable them to perform their function of either condensing or evaporating a fluid. A metering device/expansion valve 111 is provided upstream of the evaporator 110 and provides the fluid for evaporation to the evaporator 110. It will further be understood that components such as temperature or pressure gauges that would typically be provided or indeed pumps and like for ensuring the passage of the fluid through the system of FIG. 1 are not shown. Typically, a pump would be provided to pump the liquid from the receiver 109 to the evaporator 110.

The temperatures and pressures of the liquid and/or vapor in the system of FIG. 1 can vary or be set at desired levels. Typically, the pressure of the vapor at the inlet of the compressor is between 1.1 and 1.5 bar. Typically, the pressure of the compressed vapor leaving the compressor will be between 8 and 15 bar.

The present system provides a compressor designed to suck (from) or discharge gases (into) systems such as refrigerating systems, air conditioners, actuating jackhammers or force air into inflatable objects. As will be explained below, in non-limiting embodiments it realizes recuperation of the energy based on the interaction of opposite forces of two springs (17 and 18 in FIG. 2) that are generated by a linkage with bistable structure. Two shape memory alloy (SMA) wires (9' and 10' in FIG. 2) are used for triggering between two stable structures of the system shown in FIG. 2, as will be explained in detail below. The combination of bistability and energy recuperation decreases the energy consumption of the compressor and accelerates (speed up) the SMA actuation. The compressor can thus be used in systems, such as the refrigeration system shown in FIG. 1, increasing the efficiency of the refrigeration system as a whole.

Referring now to the accompanying drawings, an example of a compressor will be described. An exemplary bistable compressor is provided that is driven by shape memory alloys SMAs and springs and, in a general sense, includes two mechanisms acting in parallel for actuating the piston; a first recuperating and a second driving mechanism, respectively.

Figure 2:
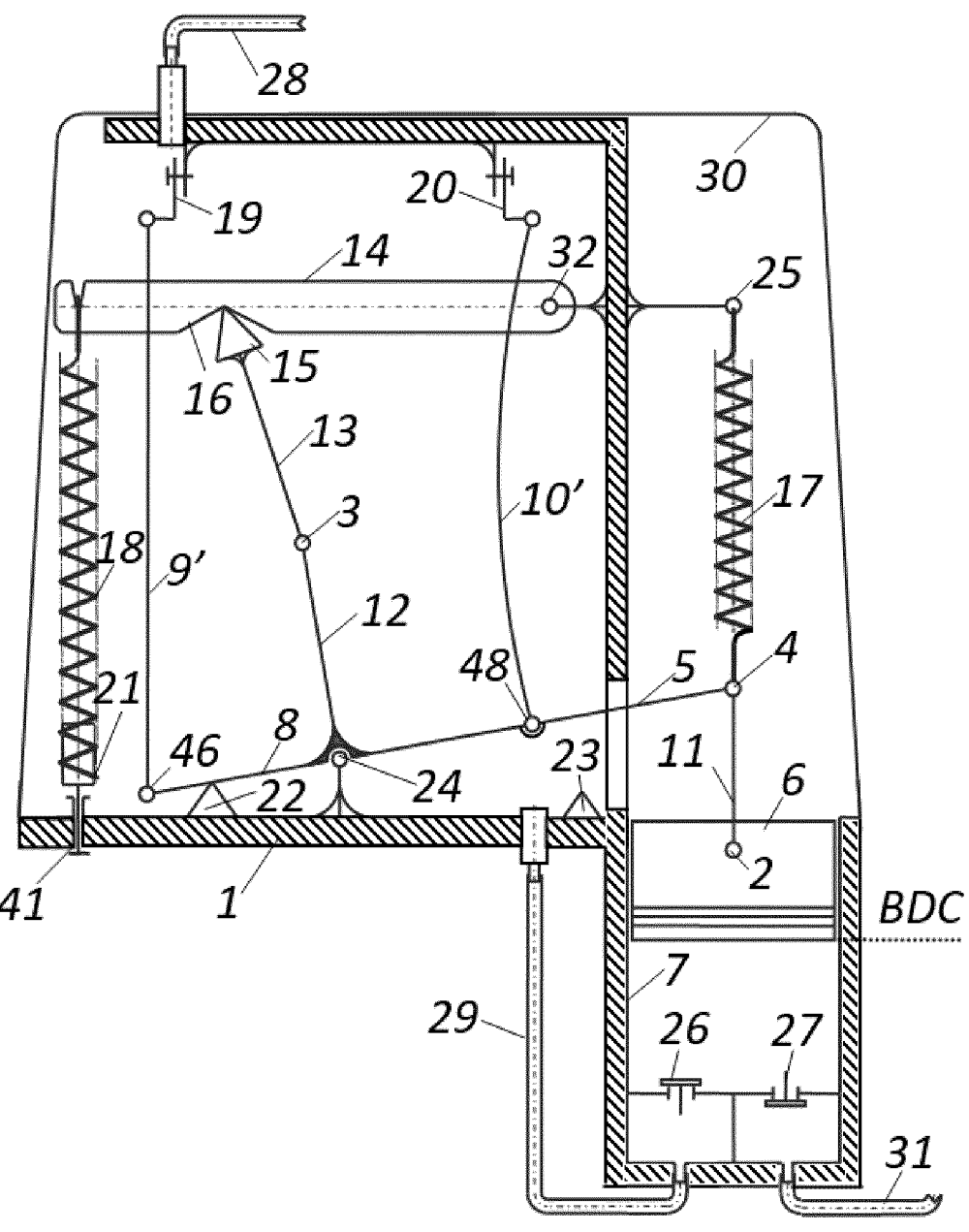
FIG. 2 is A schematic cross-sectional view through a compressor in the Bottom Dead Centre (BDC) position of the piston for use a refrigeration cycle.
Figure 3:
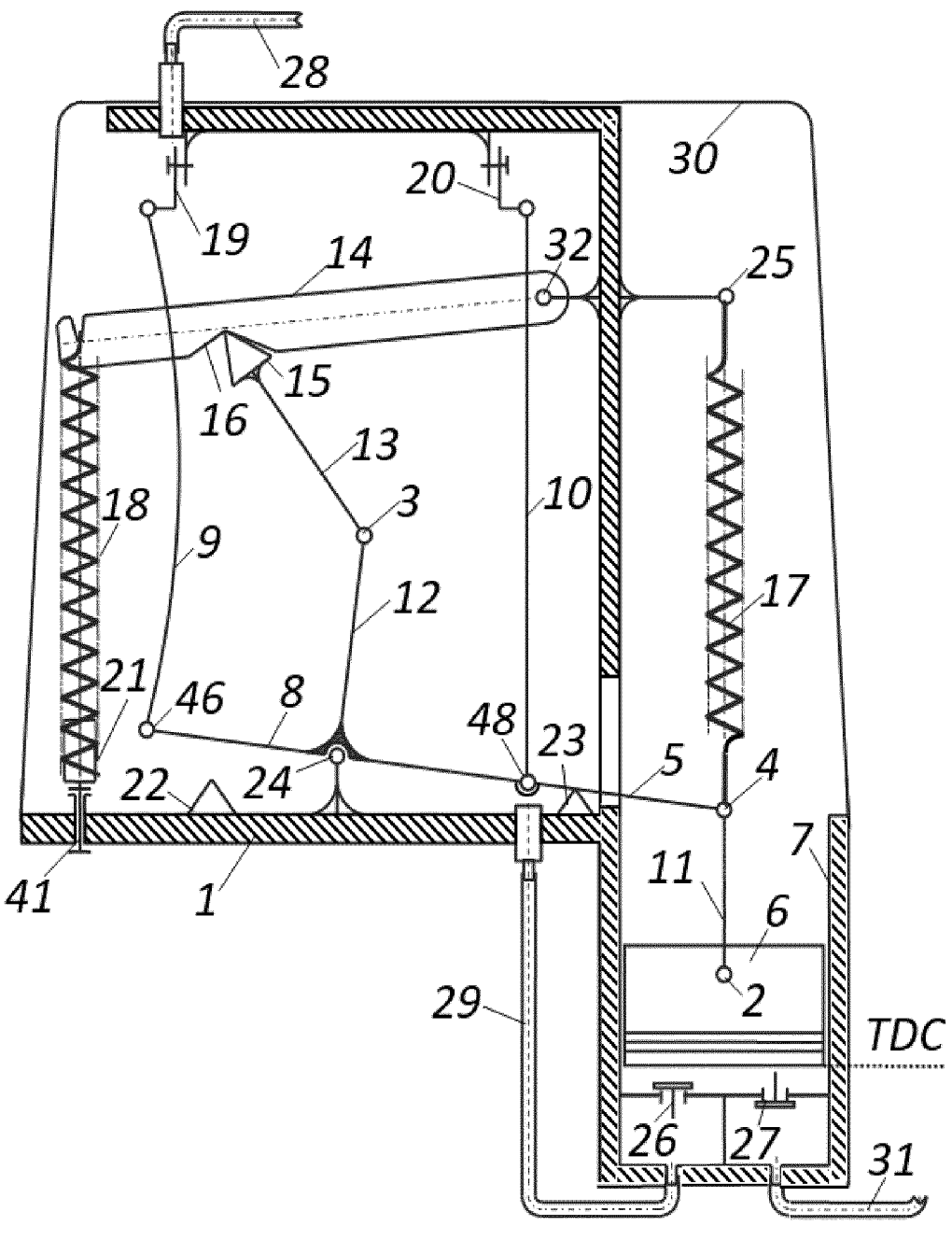
FIG. 3 is a further schematic view of a compressor in the Top Dead Centre (TDC) position of the piston for use in a refrigeration cycle.

Referring to FIGS. 2 and 3, the compressor comprises a housing member 1 with a rigidly coupled compressor chamber 7, in this example, in the form of a cylinder 7, in which a piston 6 is arranged to reciprocate. The compressor chamber 7 could be a cylinder of circular cross-section or any other suitable shape or configuration as long as it is able to receive a member such as a piston 6 to be driven by the operation of the compressor, as described herein. For example it could be elliptical, square, rectangular rhombus or any other shape in cross-section. The piston would be shaped correspondingly.

The housing member 1 has a cap 30. As will be explained below, valves 26 and 27 are provided at a bottom end of the cylinder 7 and are controlled or controllable such that the compressor is able to compress and expand a gas and further to execute discharge and suction of a gas or air through a system such as that shown in FIG. 1. Such activity is enabled through the actuation and control of the SMA wires, to be explained below. An inlet pipe 28 is provided which enables a gas to pass into the otherwise hermetically sealed region defined by the housing member 1 and cap 30. Collectively the housing member 1 and the cap 30 provide a housing for the compressor. In one example the housing member and the cap may be formed integrally or they may be formed as separate connectable components. The housing member 1 and/or the cap 30 are preferably formed of temperature insulating materials, such as a thermoplastic, plastics or composite materials so as to provide temperature insulation to the space within the housing within which the SMA element (s) are arranged.

In addition, the compressor chamber 7 is preferably formed integrally with tor even as part of the housing 1, although it can be formed of a separate component and coupled fixedly thereto.

A further connecting pipe 29 is arranged to couple the received cold gas from the defined space within the cap 30 and housing member 1 into the compression cylinder 6 through valve 26 to start a compression cycle.

Outlet pipe 31 is provided, at one end of the cylinder 6 to enable compressed high temperature fluid to pass out of the cylinder through valve 27 (controlled accordingly), and so as to allow the compressed fluid to pass into the rest of the refrigeration system as shown in FIG. 1. An opening is formed in a side wall of the housing member 1 through which the arm 5 passes. The opening is sized so as to enable unrestricted up and down movement of the arm 5, as will be explained below.

Recuperative spring mechanism includes a rocker arm 5, a third rocker arm 12, a coupler 13 having an engaging tip in the form of a sharp tip 15 engaged, e.g. meshed, with a notch 16 provided in a lever 14. The recuperative spring mechanism further comprises connected rod 11, recuperating spring 18, and piston 6 (arranged for slidable motion within cylinder provided as part of the compressor housing).

The second actuating mechanism comprises a compressing-discharging SMA wire 9 and an expanding-suction SMA wire 10. A second rocker arm 8 is provided and the system further includes the first rocker arm 5. An opening adjustable holder 19 and a closing adjustable holder 20 are provided together with connected rod 11 and the piston 6.

A piston spring 17 is provided coupled to the connected rod 11 and in normal position is arranged to ensure that piston 6 is maintained at BDC position. At the connection point of the rocker arm 5, second rocker arm 8 and third rocker arm 12 there is a pivot joint 24 between the housing member 1 and the rigidly connected rocker arms 5, 8 and 12. At the free end of second rocker arm 8 the compressing-discharging SMA wire 9 is attached. On its other end the expanding-suction SMA wire 9 is rigidly connected to a closing adjustable holder 19 which moves only vertically. The one end of expanding-suction SMA wire 10 is attached to the rocker arm 5 in point 48 and its other end is rigidly connected to opening adjustable holder 20 which can move only vertically. At the BDC position the second rocker arm 8 rotation is limited by an adjustable stopper 22. At the TDC position the rocker arm 5 is supported by adjustable stopper 23.

Recuperative spring mechanism includes a rocker arm 5, a third rocker arm 12, a coupler 13 having an engaging tip in the form of a sharp tip 15 engaged, e.g. meshed, with a notch 16 provided in a lever 14. The recuperative spring mechanism further comprises connected rod 11, recuperating spring 18, and piston 6 (arranged for slidable motion within cylinder 7 provided as part of the compressor housing 1). As mentioned above, preferably the cylinder 7 is of circular cross-section, although any suitable cross-section can be provided with a correspondingly shaped piston.

The second actuating mechanism comprises a compressing-discharging SMA wire 9 and an expanding-suction SMA wire 10. A second rocker arm 8 is provided and the system further includes the first rocker arm 5.

At the free end of third rocker arm 12 a coupler 13, in the form of a longitudinal member, is connected by a pivot joint 3. The other end of the coupler is shaped as an engagement region and is preferably a sharp tip 15 arranged to interact or mesh with a recess or notch 16 formed in lever of 14. The lever 14 is connected to the housing 1 by pivot joint 32. A recuperative spring 18 is provided attached to the free end of the lever 14. The other end of the recuperative spring is connected by a thread to adjustable screw 21.

The adjustable screw 21 is connected to the housing member 1 by a pivot joint 41. At the free end of the arm 5 the connected rod 11 is attached by a pivot joint 4. The connected rod 11 and the piston 6 are connected by pivot joint 2. The piston spring 17 is mounted to the arm 5 and the connected rod 11 in the pivot joint 4. The other end of the piston spring is fixed to the housing member 1 at a point 25. A cap 30 is provided for the housing.

As will be explained below, referring to FIG. 2, in a non-limiting and preferred embodiment, the compressor device comprises a rocker made up of three arms including a first arm 5, and second and third arms 8 and 12. The second and third arms 8 and 12 in this example are part of a single continuous member with the first arm 5 projecting perpendicularly from the single continuous member. The triple armed rocker is coupled to SMA elements 9 and 10. The triple armed rocker is caused to move under the action of the SMA elements 9 and 10. A piston 6 is provided, coupled at piston connection 2 to one end of one of the arm 5 of the triple armed rocker by a connecting rod 11. Accordingly, as the triple armed rocker rocks about a pivot point 24, it drives the piston 6 in reciprocating motion within a cylinder 7. Valves 26 and 27 are provided at one end of the cylinder 7 remote from the rocker arm 5 and are controlled in such a way that as the piston moves within the cylinder 7, a gas such as air, can be compressed and driven from or sucked into the cylinder for further operation.

The first and second rocker arms 5 and 8 are connected to SMA elements 9 and 10 at points 46 and 48. SMA elements 9 and 10 and themselves connected to the housing 1 at connectors 19 and 20, respectively.

Referring to the rocker, at a distal end, the first rocker arm 5 is coupled by a pivot joint 4 to the connecting rod 11 which itself is attached by a second joint, such as a pivot joint, 2 to the piston 6. The piston 6 is arranged and configured for slidable movement within cylinder 7. At the pivot joint or piston connection 4 between the connecting rod 11 and the arm 5 of the rocker, a piston spring 17 is mounted, coupled to a fixed position 25 relative to the housing member 1.

The rocking of the triple armed rocker (comprising the rocker arms 5, 8, and, 12) is caused through the activity of the two SMA elements or wires, one of which 10 is attached to the first rocker arm 5 and the other of which 9 is attached to the second rocker arm 8. The third arm 12 of the rocker is connected to a coupler 13. The coupler 13 has a tip 15, preferably sharp, which is meshed into a notch 16 of a lever 14. The lever 14 is itself connected to the housing 1 by a pivot joint 32.

At the free end of the lever 14 a recuperating spring 18 is attached. The other end of the recuperating spring 18 is connected to the housing 1 by a connector such as a screw. Preferably, the screw is an adjustable screw, 21.

The dimensions of the three arm rocker 5, 8 and 12, coupler 13 and lever 14 are chosen in such a way so that around the central angular position of the stroke of the three arm rocker, the piston force and the piston spring force are in equilibrium with the recuperating spring force. Thus, in this intermediate state, i.e. the central angular position, the three arm rocker 5, 8 and 12 is in an unstable equilibrium position.

To understand the movement of the rocker and the piston 7 during a cycle of operation we consider first the situation before the unstable position. At the start of a stroke or cycle, the piston 7 is at its bottom dead center (BDC) position as seen in FIG. 2. Gas has been drawn into the cylinder by control of the valves 26 and 27 such that, with the valves 26 and 27 now both closed it is ready for compression to commence. This BDC characterizes the beginning of the compression or the end of suction of the compressor cycle and corresponds to the first stable equilibrium position of the compressor. At this position the force from the recuperating spring 18, i.e. a recuperating spring force, is smaller than the sum of the piston force and the force of the piston spring 17.

As a result of the balance of forces between the springs 17 and 18 and SMA elements 9 and 10, the piston is driven from its BDC position (FIG. 2) to its TDC position (FIG. 3). At the end of the compression that coincides with the beginning of the suction the piston is now in its top dead center (TDC) position.

Then, the recuperating force is larger than the sum of piston force and compression spring force and the three arm rocker is in its second closed stable equilibrium position, i.e. as shown in FIG. 3 with the end at which pivot joint 4 is positioned being in a down position corresponding to the TDC position of the piston 6. Thus, in simple terms it can be seen that the rocker moving about pivot joint 24 can effectively see-saw such that the end 4 coupled to the piston 6 moves up and down cyclically thus driving movement of the piston in the cylinder correspondingly.

The piston obtains two end on/off stable positions. The general operation of this mechanism will be understood by reference for example to GB2558618A of the same inventors as the present disclosure, and referred to above.

The cooled gas, which is returned by the compressor system (described above with reference to FIG. 1) before being sucked into the cylinder 7, is passed through the hermetically sealed space between the housing 1 and the cap 30 in which the SMA wires are positioned, and increases the speed of operation of the SMA wires and consequently the frequency of operation of the compressor.

Because of lowered energy due to the recuperation a very weak force is required to toggle the on/off compressor. This force is applied by two SMA wires.

When the piston starts from its BDC the first SMA wire rotates the rocker from open position to the unstable position and after that the recuperating spring continues the discharging of the compressor. When the piston is TDC the second SMA wire rotates the rocker from stable TDC position to the unstable position and after that the compressing spring continues driving the piston to its BDC. The unstable positions do not coincide for both directions of motion of the piston from BDC to TDC and vice versa because of changing of the directions and shape of the piston forces. At the end of both moves from TDC to BDC and vice versa, the non-driving SMA wire stretches, thus avoiding shocks and unbalance.

Due to the very weak driving forces of the SMA wires, their shortened stroke of actuation the total energy consumption of the compressor is dramatically reduced.

A bistable compressor is provided which is driven by shape memory alloy (SMA) wires and springs with recuperating action. The optimal distribution of the potential energies of the springs and the gas pressure through a bistable recovery mechanism as well as the cooing of the SMA wires reduces the energy consumption and increases the operating frequency at guaranteed minimum size and noiselessness of the compressor.

The compressor is a pneumatic device with wide application in refrigeration systems, air conditioners as well as in the devices for compression or expansion of air.

As will be explained below in detail, the compressor consists of a housing to which a cylinder is fixedly mounted, or integrally formed. A piston is arranged to reciprocate within the cylinder and the piston is coupled to the output link of the bistable mechanism so as to cause the piston to slide in the piston.

The piston 6 is coupled to a connected rod 11 by a pivot joint 2. By a secondary pivot joint 4 the connected rod 11 is attached to a first arm 5 of a rocker which itself is connected to the housing by a pivot joint 24. At the same first arm of the rocker an SMA wire 10 for moving the piston from top dead center (TDC) to bottom dead center (BDC) is attached. At the end of a second arm 8 of the rocker, which is collinear with the first one but at the opposite side of the pivot joint 24 between the rocker and the housing, an SMA wire 9 for moving the piston from BDC to TDC is provided.

The ends of opening and closing SMA wires are connected to the housing through holders 19 and 20 with adjustable positions. The rocker also comprises the third arm 12 whose axis passes through the fixed pivot joint 24 and is perpendicular to the line or longitudinal axis of the first two arms 5 and 8. At the end of this third rocker arm 12, by a further pivot joint 3, a coupler 13 with a sharp tip 15 is attached. The sharp tip 15 of the coupler 13 meshes with a notch 16 made in the lever 14, which lever 14 is itself connected to the housing by a pivot joint 32.

At the free end of the lever, a recuperative spring 18 is attached. The second end of the recuperative spring 18 is attached to the housing by, in this example, an adjustable screw 21. The screw 21 may be used to adjust the spring length and its stiffness as well.

The rotation or pivoting of the rocker about pivot point 24 is limited by two stoppers 20 and 22, preferably fixedly mounted to the housing. The stoppers 23 and 22 are preferably of variable height for adjusting the stroke of the piston. The two SMA wires 9 and 10 are always in two different drive or idle states.

When a SMA wire is in a state of drive, it is stretched and raises its temperature with the help of electric current. Then the heating shortens the SMA wire and at a certain temperature it triggers the bistable mechanism by relaxing and entering at idle mode.

Figure 4:
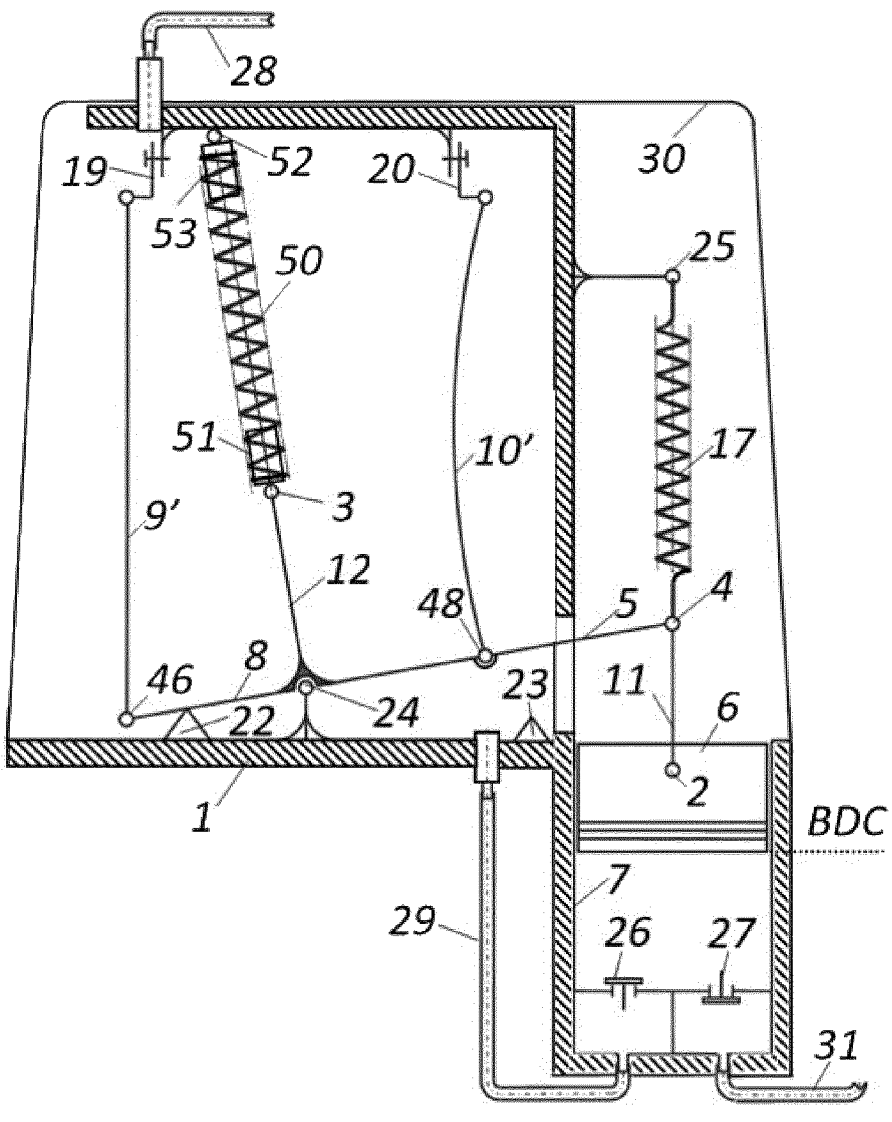
FIG. 4 is variant of A schematic cross-sectional view through a compressor in the Bottom Dead Centre (BDC) position of the piston for use a refrigeration cycle.
Figure 5:
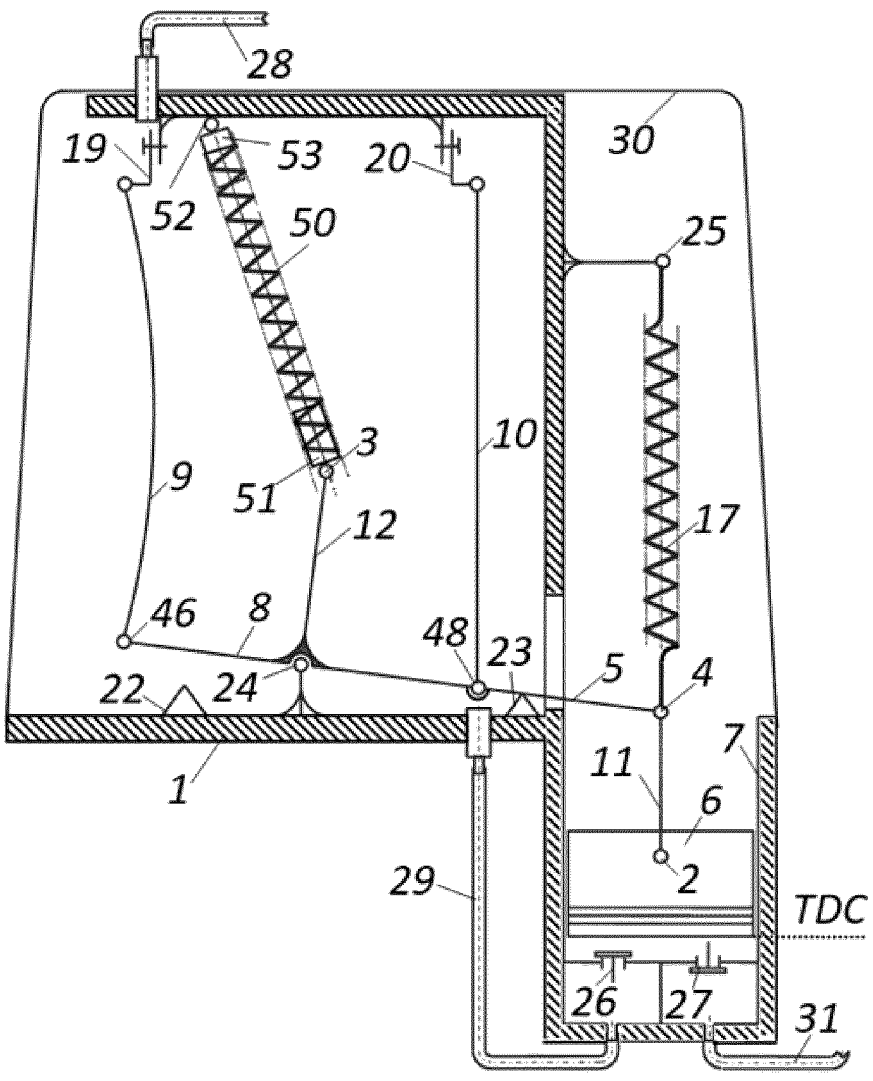
FIG. 5 is variant a further schematic view of a compressor in the Top Dead Centre (TDC) position of the piston for use in a refrigeration cycle.

FIGS. 4 and 5 show a further embodiment relying on similar principles to those described above with reference to FIGS. 2 and 3. However, in the example of FIGS. 4 and 5, the lever 14 with its notch 16 and the coupler 13 with the sharp tip are removed. The tensile recuperative spring 18 of the example of FIGS. 2 and 3, is replaced by a compression recuperative spring 50 suspended by a guiding cylinder 53 to the base 1 by a hinge or rotatable pivot joint 52. The other end of the compression recuperative spring 50 is attached by a second guiding cylinder 51 to the arm 12 by a rotatable joint such as hinge 3.

The embodiment or example of FIGS. 4 and 5 thus provides a simpler construction than that of FIGS. 2 and 3. The component part is reduced whilst still providing the technical benefits of the embodiment of FIGS. 2 and 3. In this example, referring first to FIG. 4, the assembly can be seen with the piston 6 in its BDC position. The compression spring 50 is in a compressed state (its length is shorter than it is in FIG. 5). The drivers of the system are again the SMA elements 9 and 10 which may be controlled by desired current or control inputs to cause a switch in state. The springs 17 and 50 provide forces that in combination with those of the SMA elements enable the system to operate in a comparable way to that of FIGS. 2 and 3.

In general, and applicable to all embodiments, it will be appreciated, that in an idle state, the SMA wires are free from stress and gradually cool due to their presence and arrangement within the cool chamber formed by the housing 1 and cover 30. At the moment of switching of the bistable mechanism, e.g. upon application of a current or other such control signal, the SMA elements 9 and 10 stretch and thus are in a driving state.

In the idle state, the SMA wire has a changed geometry. The cold gas, which is sucked out of the refrigeration system cools the SMA wires, which creates preconditions for increasing the switching frequency.

The mechanical advantages of the compressor described herein is substantially based on the parallel action of two mechanisms for actuating the piston; a first counteracting and a second actuating mechanism respectively. The thermal advantages are derived from the positioning the SMAs in a cold gas temperatures in the compressor to reduce the energy consumption and expand the frequency bandwidth.

As will be explained in detail below, the recuperating mechanism preferably consists of the recuperative spring, the lever, the coupler, the connected rod, and the piston. By this kinematic chain the recuperative spring generates a counteracting force F which counteracts the sums of piston spring force Q and compression-discharge gas force C, or the spring force Q and expansion-suction gas force E.

When the piston is BDC the recuperating force is less than the piston force. The rocker is propped to the opening stopper and four-bar linkage in its first stable open position.

The dimensions of the links are chosen in such a way to ensure an unstable position around the middle of the rocker stroke. In this position the recuperating force and the piston force are equal but with opposite directions.

When the piston is in a TDC position, the recuperative force is bigger than the piston force which ensures the second stable position. In this position the rocker is constrained by the closing stopper 23.

The effect of the system is such that triggering of the recuperating mechanism creates a reciprocating motion of the piston 6.

The second actuating mechanism comprises the compressing-discharging and the expanding-suction SMA wires, the first and second rocker arms, the connected rod 13, and the piston 6.

On actuation, the SMA wires only overcome the difference between the recuperating and the piston force, and actuate the piston only in the half of its stroke. The second half of the stroke of the piston is carried out by the positive difference between the two forces Q and F.

A substantial advantage of the compressor is that the SMA wire strokes and the force overcome are considerably reduced through the realized recuperation of the piston spring energy, which is transferred to the recuperating spring during expansion-suction the valve and vice versa—from the recuperation spring to the piston spring compression-discharge stroke of the piston.

As will further be explained below, preferably an actuator is provided that itself comprises an electronic control system for optimal pulse width modulation (PWM) of the SMA wires.

In operation, cold gas such as Freon or air is sucked in by the inlet valve 26 and passes through the pipes 28 and 29, thus feeding the hermetically closed space defined by the housing, itself in embodiments defined by the housing member 1 and the cap 30. This provides the SMA wires with a low temperature environment. Typically the temperature within the hermetically closed space might be between –2.8 and 3.7 degrees C. This low temperature shortens the cooling time of the idle wires and increases the triggering frequency of the bistable mechanism. The refrigeration system is supplied with gas under pressure and high temperature by means of a pipe 31, the gas having been compressed as result of a compression cycle, i.e. as a result of the piston 6 moving from its BDC to its TDC.

The recuperating spring 18, the lever 14, the notch 16, the tip 15, the coupler 13, the third rocker arm 12, the rocker arm 5 the connected rod 11, and the cylinder 6 form a recuperating mechanism which generates at the piston 6, a force Q called the recuperative force. The direction of this recuperative force Q is opposite to the forces that act on the piston. During the compression-discharge period (CDP) these forces are the sum of piston spring (17) force F and compression-discharge force C (see FIG. 6) or during expansion-suction period (ESP) is the sum of piston spring (17) force F and expansion-suction force E (see FIG. 7). As can be seen the piston spring force F increases linearly with piston displacement from BDC.

When the piston 6 is BDC the recuperating force Q is less than the sum of the piston gas force C and the spring piston force F. During the compression-discharging period, near to an arbitrary midway point of the stroke the equality Q=F+C is satisfied. Thus, an unstable equilibrium position appears around the middle of the compression-discharging stroke. When the rocker arm 5 is turned to the contact to the stopper 23 the piston 6 is in TDC and the recuperating force Q of the recuperating spring 18 is bigger than the sum of the sum forces F+C. Then the piston 6 is its second stable position (FIG. 3).

The useful result thereof is that in the proposed device the closing SMA wire 9 and the opening SMA wire 10 are only loaded with the difference between the force Q and the counteracting force F+C or F+E. The loading of the SMA is only around for the first half of the stroke of the piston 6. During the second half of the stroke piston 6 the difference between the forces is in the direction of movement of the piston 6, and the recuperating spring 18 is the driver.

In such a way, a recuperation of the energy of the spring 18 is realized (see FIGS. 6 to 8).

When the piston 6 passes from TDC to BDC the SMA wire 10 rotates the rocker arm 5 only at the first part of the stroke of the piston 6. Around the middle of the stroke the sum of the force F of the piston spring plus piston gas force E are equal to the recuperative force Q. Thus, the piston 6 again is in an unstable equilibrium state for expansion-suction period. The force of the open SMA wire 10 has to act the rocker arm 5 only to this position. After the closing unstable equilibrium position, the difference between the recuperating force Q and sum of the piston spring force F plus the piston gas force E becomes positive and it acts in the direction of the motion. In this case, after the expansion-suction unstable point the piston spring 17 is the driver (FIG. 9).

In such way, a recuperation of the energy of the piston spring 17 is realized (see FIGS. 9 and 11). The hatched (shaded) area (see in FIGS. 10 and 11) is the necessary potential energy of the SMA wires that have to overcome for expansion-suction period (FIG. 10) and for compression-discharge period (FIG. 11).

Thus, the objective posed is achieved to provide a compressor driven bistable by shape memory alloys with minimal power consumption.

Figure 12:
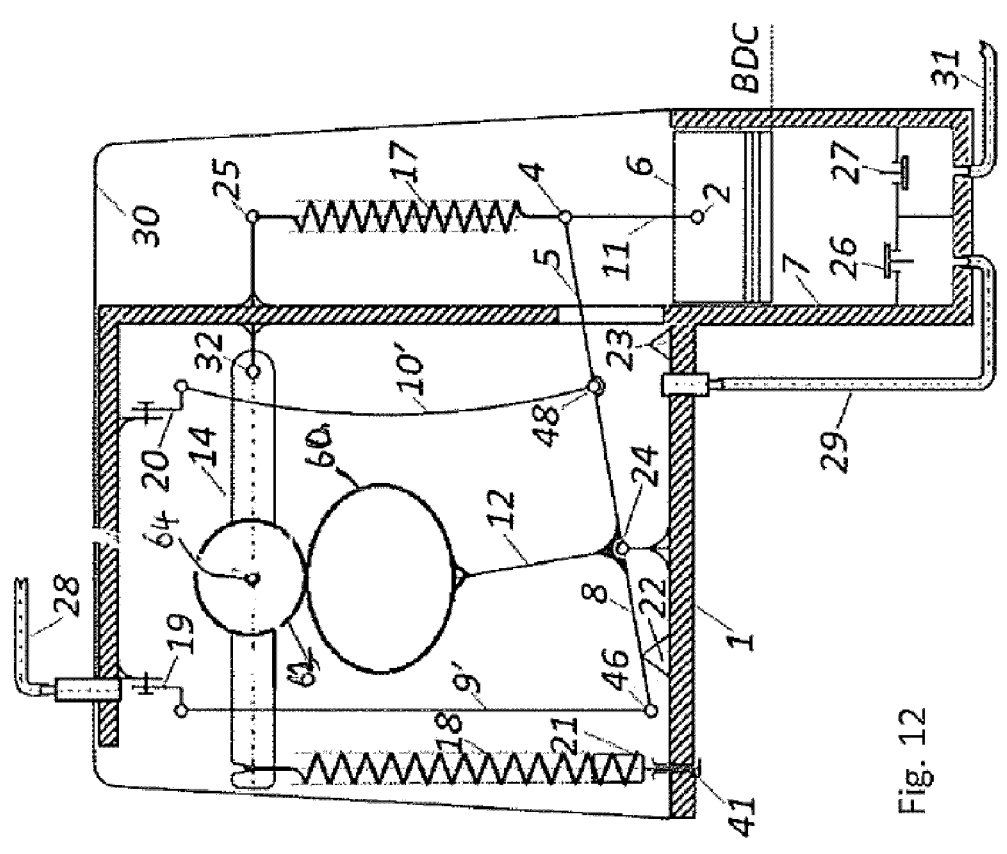
FIG. 12 is a schematic cross-sectional view through a compressor similar to that of FIGS. 2 and 3.

FIG. 12 is a schematic cross-sectional view through a compressor similar to that of FIGS. 2 and 3. Like components are labelled with the same reference numerals and their functions correspond. In the example of FIG. 12, as compared to the examples of FIGS. 2 and 3, the lever 14 with its notch 16 and the coupler 13 pivotably connected at point 3 to the arm 12 are replaced instead with a cam 60 of generally elliptical cross section and a roller 62, rotatably coupled to the lever 14 at point 64. In operation, as the rocker rocks about pivot joint 24 in the manner described above with reference to FIGS. 2 and 3, the cam 60 engages with roller 62 to enable a smoother engagement than is achieved with the examples of FIGS. 2 and 3 (even that examples itself works well).

The cam 60 is fixedly connected to the arm 12, i.e. it does not rotate or move at all relative to the end of the arm 12. However, as the arm 12 pivots about joint 24, the roller 62 pivots about its axis defined by joint 64.

Embodiments of the present disclosure have been described with particular reference to the examples illustrated. However, it will be appreciated that variations and modifications may be made to the examples described within the scope of the present disclosure.

The invention claimed is:

1. A compressor, comprising:

a housing having a fluid inlet and a fluid outlet through which a compressible fluid is configured to be provided to or removed from the housing;

a compressor cylinder coupled to the housing and having a moveable member arranged to be driven in reciprocating movement during a compression cycle, wherein the cylinder is arranged to receive fluid from the housing;

a rocker movable between a first stable state and a second stable state, arranged such that the moveable member is driven in the compressor cylinder in response to movement of the rocker; and one or more shape memory alloy (SMA) elements coupled to the rocker, actuatable to change between a first shape and a second shape and thereby to drive the rocker.

2. The compressor of claim 1, wherein the housing defines a hermetically sealed space, and the housing includes the fluid inlet and fluid outlet.

3. The compressor of claim 1, wherein the cylinder includes valves timed to open and close such that upon movement of the piston in one direction, air is compressed and then driven out of the piston, and upon movement of the piston in another direction, air is drawn into the piston.

4. The compressor of claim 2 wherein the housing includes a cap to define the hermetically sealed space.

5. The compressor of claim 1, wherein the rocker is a three-part rocker arranged to pivot in reciprocating movement.

6. The compressor of claim 5, further comprising a lever arranged to engage with the rocker, wherein the lever has one end pivotally mounted to the housing.

7. The compressor of claim 6, further comprising a first spring connected to the rocker to provide a balancing force to the SMA elements.

8. The compressor of claim 7, further comprising a second spring connected to the rocker to provide a balancing force to the SMA elements.

9. The compressor of claim 2, wherein the fluid inlet is arranged to receive cold gas into the hermetically sealed space.

10. The compressor of claim 9, wherein the fluid inlet is arranged to receive gas within a temperature range of –2.8 and 3.7 degrees C.

11. The compressor of claim 7, wherein the first spring is a compression spring arranged to be pivoted at a first end at a fixed position on an inside of the housing and at a second end to the rocker.

12. The compressor of claim 8, wherein the first spring is a piston spring arranged to bias the piston to a bottom dead center position and the second spring is a recuperative spring to provide recuperative force to the rocker during the compression cycle.

13. The compressor of claim 1, further comprising one or more adjustable holders for adjustably connecting the SMA elements to the housing.

14. The compressor of claim 1, wherein the rocker is also arranged to be in a third state between the first and second states, wherein the third state is unstable, and wherein two or more SMA elements are coupled to the rocker, wherein the two or more SMA elements are electrothermally actuatable to change the rocker position between the first stable state and the third unstable state or between the second stable state and the third unstable state and thereby to drive the rocker, wherein the compressor further comprises:

a recuperative spring configured to drive the rocker from the third unstable state to the second stable state; and a piston spring configured to drive the rocker from the third unstable state to the first stable state.

15. The compressor of claim 7, wherein the rocker includes a coupler to engage with the lever.

16. The compressor of claim 15, wherein the coupler is an arm pivotally coupled to the rocker.

17. The compressor of claim 16, wherein the coupler is a cam fixedly coupled to the rocker, arranged to engage with the lever.

18. The compressor of claim 17, wherein the cam is arranged to engage with a pivotally mounted roller on the lever.

19. A refrigeration system, comprising:

a compressor of claim 1;

a condenser configured to receive vapor from the compressor; and an evaporator configured to receive liquid and provide cooled vapor as an input to the compressor for compression.

20. A method of compressing a fluid, comprising:

providing a housing and a compressor cylinder coupled to the housing and having a moveable member arranged to be driven in reciprocating movement during a compression cycle, a rocker movable between a first stable state and a second stable state, arranged such that on movement of the rocker the moveable member is driven in the compressor cylinder, one or more shape memory alloy (SMA) elements coupled to the rocker, actuatable to change between a first shape and a second shape and thereby to drive the rocker;

providing a cooled fluid to the housing; and providing fluid from the housing into the cylinder for compression.

21. The method according to claim 20, in which the housing is hermetically sealed such that fluid can only enter or leave the housing through a defined inlet and outlet, respectively.

22. A compressor, comprising:

a housing having a fluid inlet through which compressible fluid is configured to be provided and a fluid outlet to enable passage of fluid from the housing;

a compressor chamber having a moveable member arranged to be driven in reciprocating movement during a compression cycle, wherein the compressor chamber is arranged to receive fluid from the housing;

a rocker movable between a first stable state and a second stable state, arranged such that the moveable member is driven in the compressor chamber in response to movement of the rocker; and one or more shape memory alloy (SMA) elements coupled to the rocker, actuatable to change between a first shape and a second shape and thereby to drive the rocker.

* * * * *